No. 783,382. PATENTED FEB. 21, 1905.
E. McCOY.
JOURNAL LUBRICATOR.
APPLICATION FILED MAR. 10, 1902.
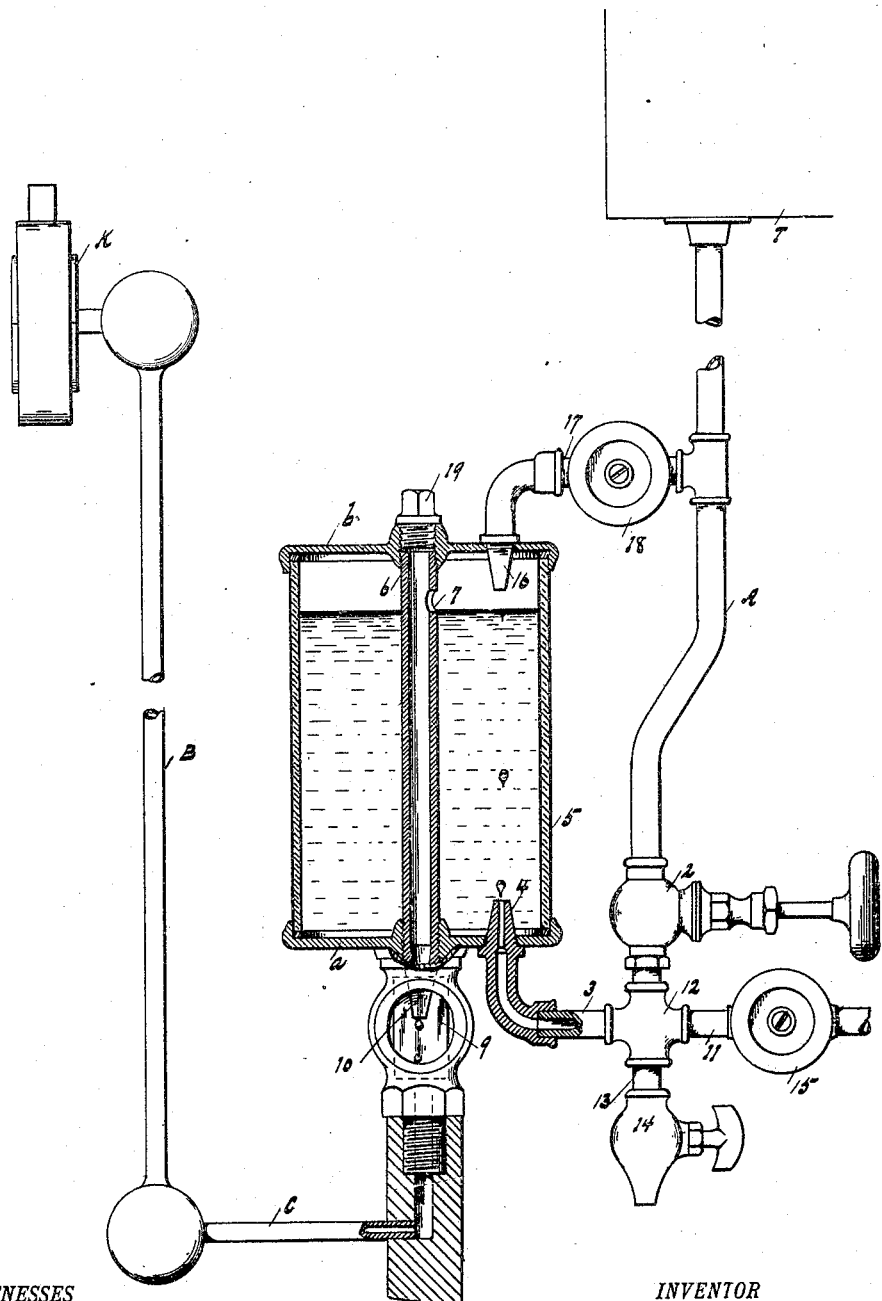
WITNESSES
Lotta Lee Hayton.
INVENTOR
Elijah McCoy
By
Parker & Burton Attorneys.

No. 783,382. Patented February 21, 1905.

UNITED STATES PATENT OFFICE.

ELIJAH McCOY, OF DETROIT, MICHIGAN, ASSIGNOR TO DETROIT LUBRICATOR COMPANY, OF DETROIT, MICHIGAN.

JOURNAL-LUBRICATOR.

SPECIFICATION forming part of Letters Patent No. 783,382, dated February 21, 1905.

Application filed March 10, 1902. Serial No. 97,438.

*To all whom it may concern:*

Be it known that I, ELIJAH McCOY, a citizen of the United States, residing at Detroit, county of Wayne, State of Michigan, have invented a certain new and useful Improvement in Journal-Lubricators; and I declare the following to be a full, clear, and exact description of the invention, such as will enable others skilled in the art to which it pertains to make and use the same, reference being had to the accompanying drawing, which forms a part of this specification.

This invention relates to lubricators for journals, and has for its object an improved lubricator arranged to cleanse the lubricating-oil on its way from the storage-tank to the journal and also arranged to permit of its easy regulation, so that the engineer may use oil for lubricating purposes or may suspend the use of oil and turn water on his journal, as is sometimes desirable.

In many classes of machinery, especially large engines or large journals, it is the custom to use large quantities of lubricating-oil, flooding the bearing with a stream of oil which runs over the bearing and is collected in some receptacle beneath, from which it is again transferred to storage-tanks for use a second time, and the use is repeated constantly, new oil being added from time to time as the quantity diminishes in use. In using oil for lubricating purposes in this way the oil becomes contaminated with dirt, dust, the worn off portions of the bearings, and other material that should be eliminated and cleaned out from the oil, so that these deleterious materials may not come in contact with the bearings in the second or repeated use of the oil. A common way of attempting to remove such matter is by straining the oil through a strainer or filter on its way from the storage-tank to the journal in its second or after use. A strainer acts reasonably well so long as the strainer itself is clean; but the strainer itself becomes foul and the oil fails to run through it and escapes over the top of it, or the engineer in attempting to clean the strainer punctures it.

In the device which forms the object of this invention the oil on its way from the storage-tank to the bearing is delivered into a cup of water, spreads in a thin film over the top of the water, and is washed and cleansed. The deleterious matter is washed out and slowly settles through the water and settles at the bottom of the cup, whence it may be removed at intervals. The cup is arranged for a fresh supply of water at any time and for the drainage out of contaminated water, and it is arranged so that the oil-supply may be cut-off and a fresh water-supply run through the cup to the bearing for the purpose of flooding it if it be desired to take that course. I have devised a way by which a common oil-cup may be used for the above-named purposes.

The drawing shows the cup with an up-feed through contained water, also with an oil-nozzle located above the water.

The storage-tank is indicated at T in the drawing. The pipe A leads from the storage-tank and the pipe B leads to the journal. The pipe B which is shown is a pipe such as would be used to lubricate a crank-pin K, the pipe itself revolving around the horizontal pipe C, and it sometimes takes the position shown, and at times takes the reverse position or other positions.

A indicates the inlet-pipe for oil, through which the oil flows from an elevated storage-tank through the hand-manipulated regulating-valve 2 into a pipe 3, which terminates with an upward nozzle 4, that reaches above the bottom wall of a cup 5 and terminates some distance above the bottom *a* of the cup. The side walls of the cup 5 are preferably of glass, and a cap *b* is held to the top of the glass wall of the cup by a screw-threaded hollow stem 6, that engages the bottom *a* of the cup. The oil flows through hole 7 into pipe 6 and thence to delivery-pipe C, passing on its way through a sight-feed chamber 9, in which the delivery end of the hollow standard 6 is provided with a nozzle 10. A pipe 11, leading from a water-supply, (for example, from a water-main,) leads into the four-way coupling 12, from which the pipe 3 emerges.

13 is a drain-pipe leading from the coupling 12 and provided with a hand controlling-valve 14.

The water-pipe 11 is provided with a hand controlling-valve 15.

The stem 6 is hollow and is provided with an inlet-opening 7 through its wall. A second nozzle, 16, terminates the end of a branch pipe 17 from pipe A. This nozzle leads into the cup through the cap $b$.

In operation the cup 5 is filled nearly to the opening 7 with water. The water-supply is shut off and oil is admitted through the pipe A by opening the valve 2, regulating the feed by the amount of the opening of this valve. The oil rises from the nozzle 4 in drops through the water in the cup and spreads over the surface of the water until it rises high enough to escape through the hole 7, whence it passes down through the sight-feed chamber and through the pipe C to its place of use. The oil rising through the water is washed somewhat; but as it spreads over the surface of the water it is washed completely, and heavy particles held in suspension are separated and dropped to the bottom of the cup.

To clean the cup of its contained dirty water, the valve 2 is closed and the valve 14 opened. To clean the cup still further of foul matter that has settled to the bottom of it, the cap $b$ is unscrewed and the glass cylinder removed.

The feed may be through the top with a down-drop nozzle, as shown in the drawing.

In the form of device in which the oil drops from nozzle 16 the flow of oil through pipe A is controlled by hand-valve 18.

The flow of oil into the cup may be stopped at any time and water admitted to flood the journal, if desired.

The top end of pipe 6 is closed by a plug 19, which may be removed and heavy oil fed directly into the pipe 6.

What I claim is—

In a lubricator for the reuse of lubricating-oil, the combination of a cup composed of separable sections, a vertical tube connecting and piercing the end sections thereof, said tube being pierced with a lateral opening near its upper end, means connected with said cup for feeding oil and water thereinto, means for regulating the amount thereof, and means connected with the lower end of said vertical tube for conducting oil therefrom, substantially as described.

In testimony whereof I sign this specification in the presence of two witnesses.

ELIJAH McCOY.

Witnesses:
CHARLES F. BURTON,
MAY E. KOTT.